United States Patent [19]

Jacob-Grinschgl et al.

[11] Patent Number: 4,918,263
[45] Date of Patent: Apr. 17, 1990

[54] CO-ORDINATE MEASURING SYSTEM

[75] Inventors: Wolfgang Jacob-Grinschgl, Munich; Udo Müller, Unterschleissheim, both of Fed. Rep. of Germany

[73] Assignee: Kontron Holding AG, Zurich, Switzerland

[21] Appl. No.: 383,254

[22] Filed: Jul. 21, 1989

Related U.S. Application Data

[63] Continuation of Ser. No. 193,228, May 11, 1988, abandoned, which is a continuation of Ser. No. 98,718, Sep. 21, 1987, abandoned, which is a continuation of Ser. No. 841,507, Mar. 19, 1986, abandoned.

[30] Foreign Application Priority Data

Apr. 1, 1985 [DE] Fed. Rep. of Germany ....... 3511864

[51] Int. Cl.$^4$ ............................................. G08C 21/00
[52] U.S. Cl. .................................................... 178/19
[58] Field of Search ............................... 178/18, 19, 20

[56] References Cited

U.S. PATENT DOCUMENTS

| | | | |
|---|---|---|---|
| 3,647,963 | 3/1972 | Bailey | 178/19 |
| 3,699,253 | 10/1972 | Freedman | 178/19 |
| 3,700,809 | 10/1972 | Nadon | 178/87 |
| 3,725,760 | 4/1973 | Bailey | 318/568 |
| 3,735,044 | 5/1973 | Centner | 178/19 |
| 3,801,733 | 4/1974 | Bailey | 178/19 |
| 3,846,580 | 11/1974 | Brenner | 178/19 |
| 3,865,977 | 11/1975 | Hiraki et al. | 178/19 |
| 3,873,770 | 3/1975 | Ioannon | 178/18 |
| 3,904,821 | 9/1975 | Whetstone | 178/19 |
| 3,904,822 | 9/1975 | Kamm et al. | 178/19 |
| 4,080,515 | 3/1978 | Anderson | 178/19 |
| 4,206,314 | 6/1980 | Prugh | 178/19 |
| 4,210,725 | 7/1980 | Rodgers et al. | 178/19 |
| 4,488,000 | 12/1984 | Glenn | 178/18 |
| 4,564,928 | 1/1986 | Glenn | 367/117 |
| 4,568,798 | 2/1986 | Ambros et al. | 178/18 |

Primary Examiner—Stafford D. Schreyer
Attorney, Agent, or Firm—Barnes & Thornburg

[57] ABSTRACT

A co-ordinate measuring system determines the position of a coil member relative to a grid member defined by a set of equidistant, parallel conductors associated with a co-ordinate axis of the system. The system includes a switching circuit that is constructed and arranged to produce a measuring signal in the form of a train of induced pulses in one of the members when a time variable current is applied to the other of the members. According to the present invention, a low pass filter at the front end of an evaluation circuit is responsive to the measuring signal for reducing frequency components therein due to operation of the switching circuit, and producing an output signal that is the first derivative of the envelope of the time variable magnetic flux. The second zero-axis crossing of the derivative of the output signal yields a representation of the co-ordinate of the coil relative to the grid member.

15 Claims, 3 Drawing Sheets

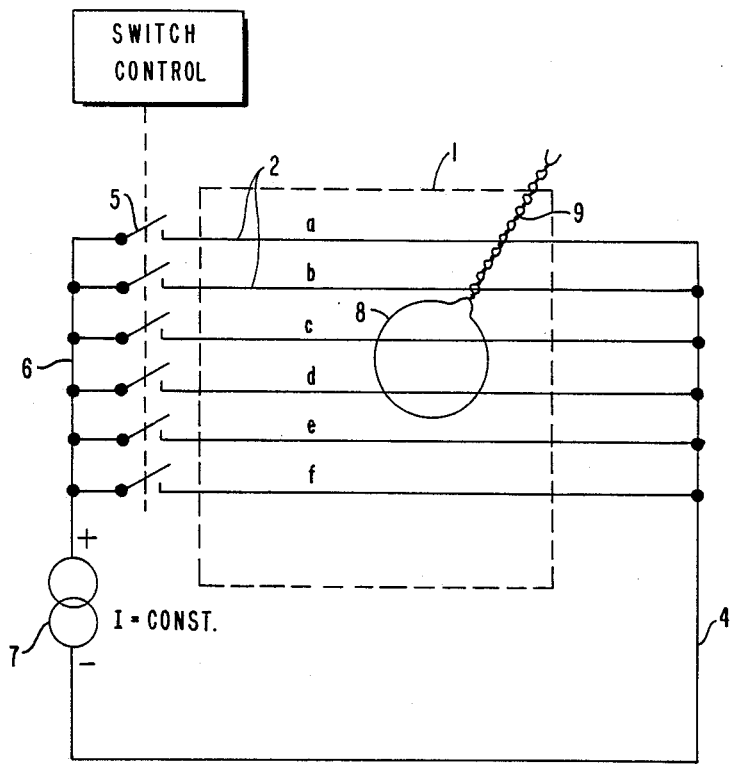
F I G. 1
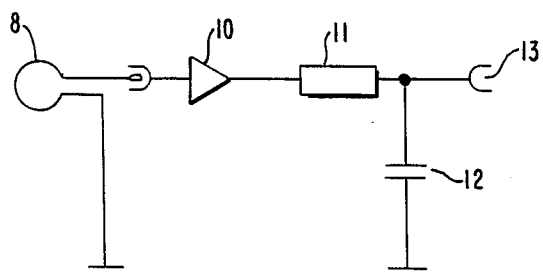
F I G. 2

CO-ORDINATE MEASURING SYSTEM

This application is a continuation of application Ser. No. 193,228, filed May 11, 1988 (now abandoned), which is a continuation of Ser. No. 098,718, filed Sept. 21, 1987 (now abandoned), which is a continuation of Ser. No. 841,507, filed Mar. 19, 1986 (abandoned).

TECHNICAL FIELD

This invention relates to a co-ordinate measuring system for determining the position of a coil member relative to a grid member, such system being hereinafter termed a system of the type described. The grid member of a system of the type described has a set of equispaced, parallel conductors that define a co-ordinate axis of the system. By applying a time-variable current to one of the members, a variable magnetic flux flows through the other member inducing a voltage therein. In a system of the type described, an evaluator circuit is responsive to the induced voltage for providing a representation of a co-ordinate of the coil member.

BACKGROUND ART

In a known system of the type described, unidirectional current pulses are respectively applied in sequence to the conductors so that the coil produces a measuring signal in the form of a train of induced voltage pulses. A demodulation circuit at the front-end of the evaluator circuit produces an output voltage that corresponds to the envelope of the induced voltage pulses. The evaluator circuit sequentially differentiates this envelope to determine its zero crossing which establishes the location of the coil relative to the conductors.

In another known co-ordinate measuring system, an alternating voltage is applied to the conductors so that a measuring signal in the form of a step-wise variable carrier frequency signal appears in the pick-up coil. A demodulator at the front end of the evaluator circuit demodulates the induced voltage forming an output voltage that corresponds to the envelope of the induced voltage. As in the first mentioned system, the zero-axis crossing of this curve is used to determine the location of the pick-up coil.

An object of the present invention is to provide a coordinate measuring system having an improved evaluator circuit.

DISCLOSURE OF THE INVENTION

The present invention provides a co-ordinate measuring system for determining the position of a coil member relative to a grid member defined by a set of equidistant, parallel conductors associated with a co-ordinate axis of the system. A switching circuit is constructed and arranged to produce a measuring signal in the form of a train of induced pulses in one of the members when a time variable current is applied to the other of the members. According to the present invention, a low pass filter at the front end of an evaluation circuit is responsive to the measuring signal for reducing frequency components therein due to operation of the switching circuit, and producing the first derivative of the envelope of the time variable magnetic flux.

In order to produce the measuring signal, the switching circuit sequentially connects each of said conductors to a common circuit for only a predetermined period of time during a sampling cycle of all the conductors. The time during which a conductor is connected to the common circuit is termed the activation time; and the time between sequential activation times of different conductors is termed a switching interval When the common circuit is connected to a constant current source, operation of the switching circuit sequentially applies unidirectional current pulses to the conductors of the grid member causing a train of pulses to be induced in the coil member. On the other hand, when a time variable current (e.g., an alternating current) is applied to the coil, a voltage is induced in each conductor; and operation of the switching circuit causes a train of pulses to appear in the common circuit or bus. In each case, the train of pulses is applied to a low pass filter.

Advantageously, the activation time exceeds the switching interval, preferably, by a factor in the range 3 to 10. However, the simplest circuit and optimum properties are obtained if the switching interval is zero.

According to one specific embodiment, the filter is a low-pass filter having a cut-off frequency below the frequency of the switching circuit. Under some circumstances, the low-pass filter is a higher-order lowpass filter in order to better suppress undesired frequencies.

According to another specific embodiment of the invention, the time variable current applied to the coil member is in the form of an alternating current having rising and falling flanks. In such case, the common circuit is connected to the low pass filter, and the activation time of each conductor occurs only during a rising or a falling flank of the alternating current. Advantageously, the alternating current has a triangular waveform. In a development of this embodiment, the absolute value of the slopes of the rising and falling flanks of the alternating current are the same; and the grid conductors are activated during both the rising and falling flanks of the alternating current. In such case, the transition from one current flank to the next takes place during a switching interval. Alternatively, the alternating current may have a sawtooth waveform; and in such case, the grid conductors are activated only during the rising, long-duration flanks.

According to another specific embodiment, the frequency of the alternating current is equal to the switching frequency. Alternatively, the ratio of the switching frequency to the current frequency is an integer between unity and the number of switching operations per sampling cycle which is the same as the number of conductors in the grid.

In one very advantageous embodiment, those current flanks during which activation of the grid conductors takes place extend over a time equal to at least the time of a grid conductor sampling cycle and each sampling cycle takes place during the occurrence of this flank. This minimizes disturbances due to undesirable switching frequency components.

The term "pick-up", as used herein, is not meant in the electrical sense, but geometrically, i.e. as a plotter for the co-ordinates of its position on the digitizing table.

BRIEF DESCRIPTION OF DRAWINGS

Embodiments of the invention is described hereinafter with reference to the accompanying drawings wherein:

FIG. 1 is a co-ordinate measuring system in which the excitation signal is applied to the grid conductors, and the measuring signal is produced by the pick-up coil;

FIG. 2 is portion of an evaluator circuit according to the present invention;

DETAILED DESCRIPTION

Figure 5:
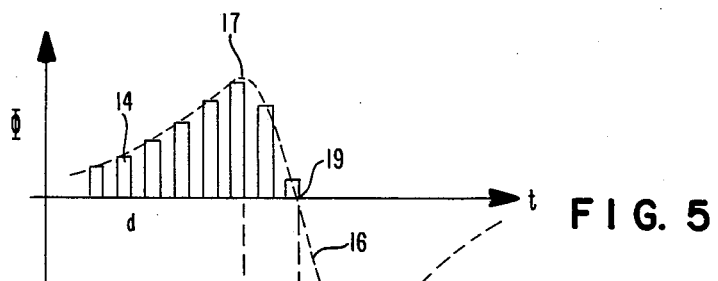
FIG. 5 is a curve similar to the curve of FIG. 3, but over a longer period of time.

A digitizing or measuring table of a co-ordinate conversion system of the present invention is shown in FIG. 1. It comprises two sets of orthogonally disposed grid conductors establishing the two co-ordinate directions of the table, but only one set, i.e., the horizontal set, comprising grid conductors 2a to 2f, is shown in FIG. 1. Only six grid conductors are illustrated in order to simplify the drawing; but in actual fact, a much larger number is used. One end of each of these grid conductors is connected to the negative side of power supply 7 which is in the form of a constant current source. The other end of each of these grid conductors is connected, through controllable switch 5, to a common circuit or bus 6 which, in turn, is connected to the positive side of power supply 7.

In the operation of the co-ordinate measuring system, each of switches 5a to 5f sequentially opens and closes once during a sampling cycle of the conductors thus sequentially connecting each of the grid conductors 2a to 2f to bus 6 for only a predetermined period of time during a sampling cycle. The time during which a conductor is connected to bus 6 is termed the activation time of the conductor; and the time between sequential activation times of adjacent conductors is termed the switching interval. The frequency with which the switches connect the conductors to bus 6 is termed the frequency of the switching circuit.

Because bus 6 is directly connected to a constant current source, the above described operation of switches 5a and 5f sequentially applies unidirectional current pulses of equal magnitude to respective grid conductors 2a to 2f. In other words, the closing and opening of switch 5a associated with conductor 2a, for example, activates that conductor causing a pulse of current to flow therethrough. After a switching interval, during which power supply 7 is disconnected from the conductors, switch 5b associated with conductor 2b is closed and opened causing a pulse of current to flow through that conductor, etc.

Pick-up coil 8, inductively coupled to the conductors, is responsive to the pulses of current flowing in the conductors for producing a train of induced pulses in output 9. The magnetic flux flowing through coil 8 is relatively small in response to the flow of current through grid conductors situated far from the pick-up coil, and is relatively large in response to the flow of current through grid conductors situated near the pick-up coil. Thus, the amplitude of a pulse induced in the coil by the flow of a pulse of current in a conductor will be a function of the distance of the conductor from the coil.

Figure 3:
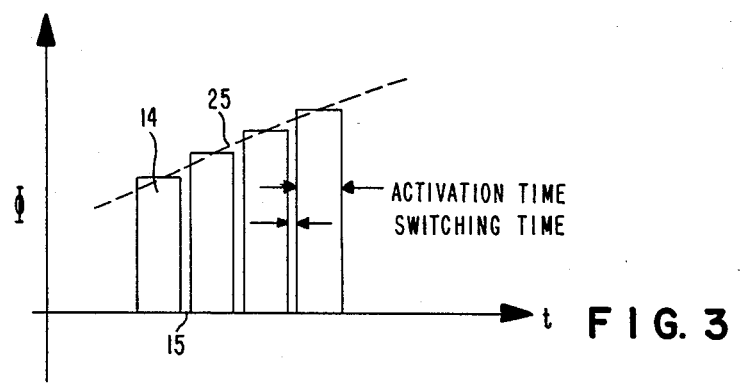
FIG. 3 is a curve of the time-variation in magnetic flux through a pick-up coil for the system of FIG. 1.

The result of the operation described above is shown in FIG. 3. Flux pulses 14 of various amplitudes flow through the coil in accordance with the location of the conductor producing the flux. The duration of each magnetic flux pulse 14 is the activation time of the conductor producing the flux pulse, and is much greater than the time interval 15 between flux pulses, which is the switching interval as shown in FIG. 3. The envelope of the magnetic flux pulse train is denoted by broken line 25 in FIG. 3.

Figure 4:
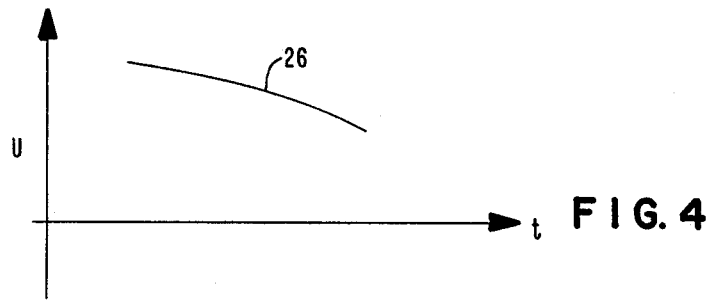
FIG. 4 is a plot showing the voltage at the output of the evaluator circuit in FIG. 2.

The magnetic flux pulse train flowing through coil 8 induces a train of voltage pulses in the coil. This train of voltage pulses is applied to an evaluator circuit whose front end is shown in FIG. 2. The output 13 of this front end is a signal that varies as indicated by curve 26 in FIG. 4, which is the first derivative of the envelope of the time-variable magnetic flux. Curve 26 shown in FIG. 4 results.

FIG. 5 shows the variation in magnetic flux seen by coil 8 during selective operation of switches 5a to 5f and the sequential application of unidirectional current pulses to the set of conductors 2a to 2f of the digitizing table. In order to simplify the drawing, the duration of the switching intervals is exaggerated.

As shown in FIG. 5, envelope 16 of the magnetic flux flowing through pick-up coil 8 has positive maximum 17, negative maximum 18 and zero-axis crossing 19. The maximum and minimum occur in time coincidence with pulses of current flowing through grid conductor closest to opposite sides of pick-up coil 8, for example through grid conductors 2b and 2d in FIG. 1. The zero-axis crossing 19 would occur in time coincidence with a pulse of current flowing through a grid conductor located at the electrical center of pick-up 8.

Figure 6:
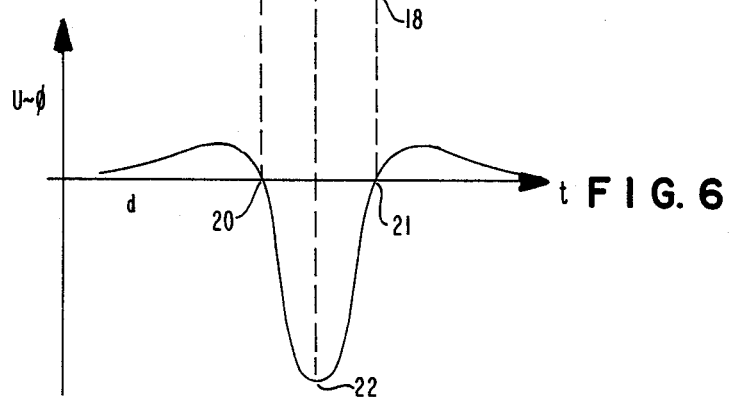
FIG. 6 is the voltage at the output of an evaluator circuit.

The evaluator circuit shown in FIG. 2 comprises amplifier 10 responsive to the voltage induced in coil 8, and a low-pass filter consisting of resistor 11 and capacitor 12. FIG. 6 shows the voltage at output 13 of the evaluator circuit in response to an induced voltage like that shown at 16 in FIG. 5. Components 11, 12 of low-pass filter are chosen to filte out those frequency components due to operation of the switching circuit. Thus, the cut-off frequency of the filter is lower than the frequency of the switching circuit. Furthermore, the voltage at output 13 corresponds to the first derivative of the magnetic flux envelope curve 16.

The shorter the switching interval, i.e., the shorter the time intervals 15 during which no current flows in any of the conductors, the higher are the frequencies in the measuring signal applied to the filter, and the easier it is to filter out undesirable frequency components. Thus, the simplest circuit and the optimum properties are obtained if the switching intervals are zero. Consequently, the switching intervals 15 should be as short as practically possible; and the duty cycle of the pulse train of magnetic flux should be almost 100%. Preferably, the grid conductor activation time exceeds the switching interval by a factor of at least 3 and preferably by a factor of 10.

Instead of a first-order low-pass filter like that shown in FIG. 2, it is sometimes desirable to use higher-order low-pass filters, e.g., a third or fourth-order low-pass filter having a Butterworth or Tschebyscheff characteristic. The longer the switching interval, in comparison with the current flow interval (i.e., the lower the duty cycle), the more important it is to use a steep-flank, higher-order, low pass filter.

In a further preferred embodiment an additional high pass filter is used for eliminating or suppressing low frequency disturbing signals. The low pass filter and the high pass filter can be replaced by an appropriate band pass filter.

Because the grid conductors are energized with unidirectional current, the frequency of the switching circuit is preferably as high as possible so that the useful signal produced at the output of the filter is sufficiently large. It is sufficient for this purpose for the switching frequency to be few kHz. By using a low-pass filter, an evaluator circuit for a co-ordinate measuring system of the type described above can be constructed with much fewer components than known systems, and enables a higher switching frequency to be used for switching the energization current to the individual grid lines.

In the exemplified embodiment described above, the grid conductors are used as transmitters and the pick-up coil is used as a receiver. Alternatively, however, according to a second embodiment of the invention shown in FIG. 7, the pick-up coil can be used as a transmitter, and the grid conductors as receivers. In this embodiment, however, the pick-up coil must be supplied with a time-varying current.

Figure 7:
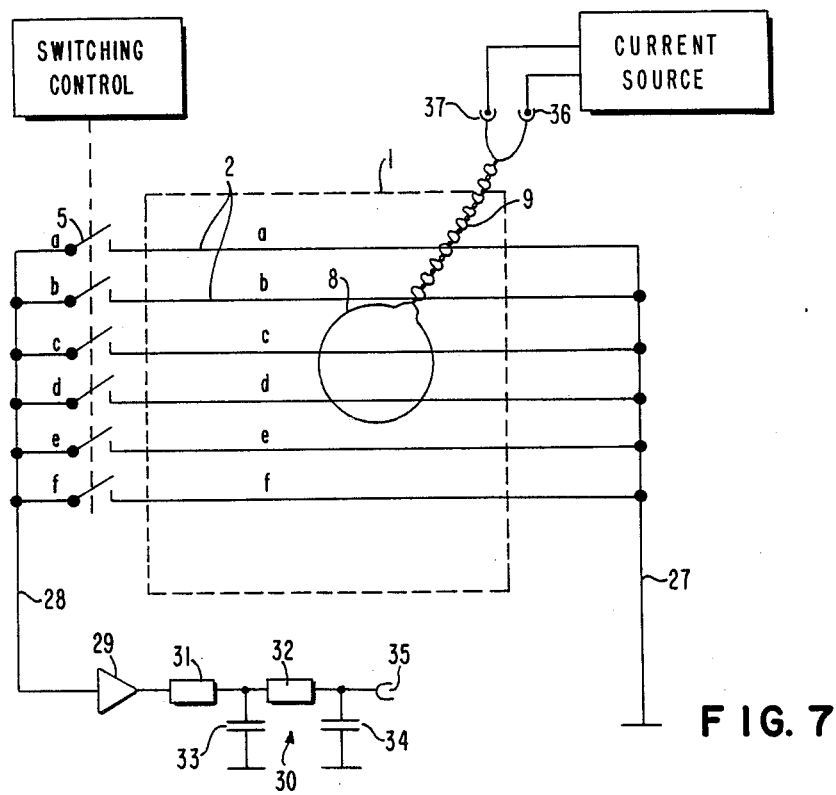
FIG. 7 is another embodiment of a co-ordinate measuring system in which, the excitation signal is applied to the coil, and the measuring signal is produced by the grid.

The digitizing table shown in FIG. 7 is similar to that shown in FIG. 1 with one exception. Pick-up coil 8, which is used as a transmitter, is supplied with current, while grid conductors $2a$–$2f$ act as receivers. One end of each of grid conductors $2a$ to $2f$ is connected to grounded bus 27 while the other end of each of grid conductors is each connected to bus 28 through controllable switch 5. Bus 28 is connected to operational amplifier 29 whose output is connected to second-order low-pass filter 30 consisting of resistors 31 and 32, and capacitors 33 and 34. The output 35 of this low-pass filter is processed as described above to locate zero-axis crossing 19.

When the digitizer table shown in FIG. 7 is in operation, a time-variable current applied to pick-up coil 8 via terminals 36 and 37 induces a voltage in each of conductors $2a$ to $2f$. While the current applied to the coil may have almost any waveform, the preferred waveforms are triangular or sawtooth curves as shown in FIGS. 8b to 8d.

Operation of switches $5a$ to $5f$ sequentially connects each of the conductors $2a$ to $2f$ to bus 28 for a predetermined period of time, in effect, sampling the voltages induced in the conductors and causing a train of pulses to appear in bus 28. The amplitude variation in these pulses is dependent on the location of the conductors relative to the coil. The hatching in FIG. 8a indicates conductor activation time (i.e., the time during which current flowing through individual conductors $2a$ to $2f$ is gated to bus 28). As shown, short switching intervals 38 exist between the closing times of switches 5.

Figure 8:
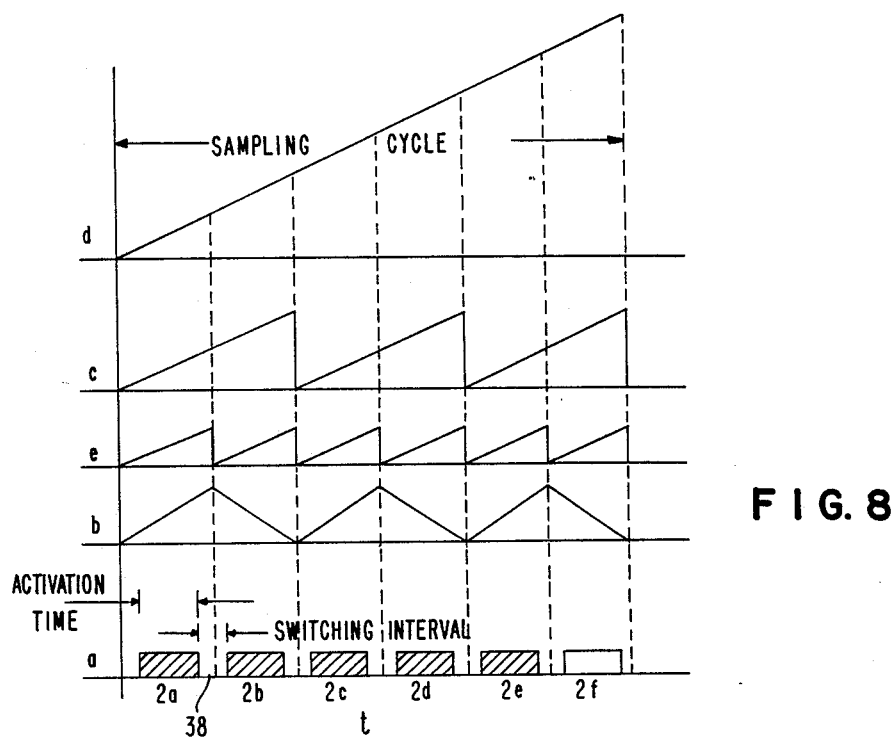
FIG. 8 shows waveforms of various types of excitation signals for use with the circuit shown in FIG. 7.

FIG. 8b shows an excitation signal for coil 8 in the form of triangular current pulses. Each peak and valley of this waveform occurs during a switching interval 38. That is to say, switches $5a$ to $5f$ are closed only during the time that the current in coil 8 is changing at a constant rate. Consequently, the voltage induced in a grid conductor during the time its associate switch 5 is closed remains constant with a magnitude that depends only on the location of the grid conductor relative to coil 8, disregarding the polarity reversal between successive grid conductors. This polarity reversal can be cancelled out in known manner by conventional switching means (not shown).

FIG. 8c shows an excitation signal for coil 8 in the form of multiple sawtooths in which the current rises over multiple sampling periods of each pair of successive grid conductors, and decreases to zero in a switching interval. The use of an excitation current of this kind eliminates polarity reversals of the direct-current voltages induced in consecutive grid conductors $2a$–$2f$ so that the voltage appearing on the signal line 28 is like that shown in FIG. 3. The induction voltage peak occurring in the grid conductors when the excitation current is switched off does not reach the low-pass filter 30 because none of switches 5 is closed during this voltage jump. Of course, the saw-tooth waveform could also occur at the same frequency as the switching frequency as shown in FIG. 8e instead of half the switching frequency as shown in FIG. 8c.

FIG. 8d shows an excitation signal for coil 8 in the form of a single sawtooth in which the rising flank of the current extends over a complete sampling cycle, i.e., over a period during which each of grid conductors $2a$–$2f$ is once activated (i.e., successively connected to and then disconnected from the low pass filter). This gives the minimum possible interference voltage amplitude because only d.c. voltages occur at the grid conductors $2a$–$2f$.

The co-ordinate measuring system can be used advantageously in conjunction with a concurrently filed application in which, when the grid conductors are used as transmitters, at least two adjacent conductors have current flowing through them in opposite directions, so that a differentiating effect is obtained. This arrangement yields a once-differentiated signal in the pick-up coil 8 and permits further simplification of the evaluator circuit.

We claim:

1. In a co-ordinate measuring system for determining the position of a coil member relative to a grid member provided with a set of equidistant, parallel conductors associated with a coordinate axis of the system; a switching circuit for sequentially connecting each of said conductors to a common circuit for only a predetermined period of time during a sampling cycle, the time during which a conductor is connected to the common circuit being termed the activation time, and the time between sequential activation times of adjacent conductors being termed the switching interval, said switching circuit being constructed and arranged to produce a measuring signal in the form of a train of induced pulses in one of the members when a time variable current is applied to the other of the members; and an evaluation circuit for processing the measuring signal to provide a representation of a coordinate of the coil member relative to the grid member, the improvement comprising:
a low pass filter connected to the member in which said measuring signal is induced and to the front end of the evaluation circuit, said filter being responsive to the measuring signal for reducing frequency components therein due to operation of said switching circuit, and producing the first derivative of the envelope of the measuring signal.

2. The invention of claim 1 wherein the activation time exceeds the switching interval.

3. The invention of claim 1 wherein the activation time exceeds the switching interval by a factor in the range 3 to 10.

4. The invention of claim 1 wherein the switching interval is essentially zero.

5. The invention of any one of claims 1–4 wherein the cutoff frequency of the filter is less than the frequency at which the switching circuit connects said conductors to said common circuit.

6. The invention of claim 5 wherein the low pass filter is one having a greater than unity order.

7. The invention of claim 6 wherein the time variable current is in the form of an alternating current having rising and falling flanks, and is applied to the coil member, wherein said common circuit is said filter, and wherein said switching circuit is constructed and arranged so that the activation time of each conductor occurs during a rising or falling flank of said alternating current.

8. The invention of claim 7 wherein the alternating current has a triangular waveform.

9. The invention of claim 8 wherein the absolute values of the rising and falling flanks are equal, and the transition from one flank to the next occurs during a switching interval.

10. The invention of claim 8 wherein the alternating current has a sawtooth waveform.

11. The invention of claim 7 wherein the frequency of the alternating current is equal to frequency of the switching circuit.

12. The invention of claim 7 wherein the ratio of the switching frequency to the frequency of the alternating current is an integer in the range between unity and the number of conductors.

13. The invention of claim 7 wherein the rising flank of the sawtooth waveform terminates during a switch interval.

14. The invention of claim 6 wherein said common circuit is a constant current supply, and the measuring signal is derived from the coil member.

15. A co-ordinate measuring system comprising:
(a) a grid member provided with a set of equidistant, parallel conductors;
(b) a coil inductively coupled to the conductors;
(c) means for applying a time-variable voltage to said coil;
(d) a switching circuit for sequentially connecting said conductors to a bus whereby a measuring signal appears in said bus; and
(e) a low pass filter connected to the bus and responsive to said measuring signal for producing an output that is the first derivative of the envelope of the measuring signal, the cut-off frequency of the filter being less than the frequency at which said switching circuit connects said conductors to said bus.

* * * * *